(12) United States Patent
Takahashi et al.

(10) Patent No.: US 12,403,860 B2
(45) Date of Patent: Sep. 2, 2025

(54) GAS GENERATOR

(71) Applicant: NIPPON KAYAKU KABUSHIKI KAISHA, Tokyo (JP)

(72) Inventors: Masahiro Takahashi, Himeji (JP); Yuichiro Tanaka, Himeji (JP)

(73) Assignee: NIPPON KAYAKU KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/708,101

(22) PCT Filed: Nov. 25, 2022

(86) PCT No.: PCT/JP2022/043639
§ 371 (c)(1),
(2) Date: May 7, 2024

(87) PCT Pub. No.: WO2023/112643
PCT Pub. Date: Jun. 22, 2023

(65) Prior Publication Data
US 2024/0351549 A1    Oct. 24, 2024

(30) Foreign Application Priority Data

Dec. 14, 2021 (JP) .................................. 2021-202709
Mar. 25, 2022 (JP) .................................. 2022-050925

(51) Int. Cl.
*B60R 21/264* (2006.01)
*B60R 21/26* (2011.01)

(52) U.S. Cl.
CPC ... *B60R 21/264* (2013.01); *B60R 2021/26011* (2013.01)

(58) Field of Classification Search
CPC ......... B60R 21/264; B60R 2021/26011; B60R 21/2644; B01J 7/00
See application file for complete search history.

(56) References Cited

U.S. PATENT DOCUMENTS

| | | | | |
|---|---|---|---|---|
| 77,360 A | * | 4/1868 | Cook | .................... B62B 5/0404 188/117 |
| 96,844 A | * | 11/1869 | Spiro | ....................... G04B 3/00 968/23 |

(Continued)

FOREIGN PATENT DOCUMENTS

| | | |
|---|---|---|
| DE | 20 2018 104 422 U1 | 12/2019 |
| JP | 2008-94259 A | 4/2008 |

(Continued)

OTHER PUBLICATIONS

International Search Report mailed Feb. 14, 2023 in PCT/JP2022/043639 filed on Nov. 25, 2022, 3 pages.

*Primary Examiner* — Paul N Dickson
*Assistant Examiner* — Shams Dhanani
(74) *Attorney, Agent, or Firm* — Oblon, McClelland, Maier & Neustadt, L.L.P.

(57) ABSTRACT

To obtain a gas generator that is easier to manufacture than before. A gas generator 100 has a long substantially columnar outer shape, and includes a housing 10, a first holder 20, a second holder 25, and a third holder 53 attached near one opening end of the housing 10, an igniter 50 that is held by the second holder 25 and ignites a gas generating agent 31, a closing member 12 attached to the other end of the housing 10 so as to close the other opening end of the housing 10, and a filter 41. The second holder 25 is fixed to the housing 10 by forming a circumferential wall 10d and a circumferential wall 10e in a state where the second holder 25 is sandwiched between the first holder 20 and the third holder 53. The third holder 53 is fixed to the housing 10 by performing diameter reduction processing (caulking processing or the like) from an outer circumference to an inner side of the housing 10 at a position corresponding to an (Continued)

annular groove portion 54 to form the circumferential wall 10*d*.

20 Claims, 4 Drawing Sheets

(56) References Cited

U.S. PATENT DOCUMENTS

| | | | |
|---|---|---|---|
| 2010/0096844 A1* | 4/2010 | Staheli | B60R 21/2644 280/741 |
| 2019/0077360 A1* | 3/2019 | Imai | B60R 21/2644 |

FOREIGN PATENT DOCUMENTS

| | | |
|---|---|---|
| JP | 2009-137402 | 6/2009 |
| JP | 2017-81343 A | 5/2017 |
| JP | 2017-193192 | 10/2017 |
| JP | 2021-138190 A | 9/2021 |
| WO | WO 2017/183626 A1 | 10/2017 |
| WO | WO 2022/138134 A1 | 6/2022 |
| WO | WO 2022/196228 A1 | 9/2022 |

* cited by examiner

GAS GENERATOR

TECHNICAL FIELD

The present invention relates to a gas generator incorporated in an airbag device as an occupant protection device mounted on an automobile or the like, and more particularly to a so-called cylinder-type gas generator having a long cylindrical shape.

BACKGROUND ART

A long cylindrical housing in a cylinder-type gas generator is generally configured such that one end thereof is closed by a closing member and the other end thereof is closed by a holder having an ignition portion (See, for example, Patent Literature 1 below).

CITATIONS LIST

Patent Literature

Patent Literature 1: JP 6579992 B2

SUMMARY OF INVENTION

Technical Problems

However, since the outer shape of the holder in the gas generator of the above Patent Literature is a complicated shape, the manufacturing becomes complicated even if the holder is cut or cast using a mold.

Therefore, an object of the present invention is to provide a gas generator that is easier to manufacture than before.

Solutions To Problems (1) A gas generator includes: a long cylindrical housing that is loaded with a gas generating agent that generates a gas by burning, includes a filter inside through which the gas passes, and has a gas ejection port that ejects the gas formed at a position corresponding to the filter; an igniter capable of igniting and combusting the gas generating agent; a tubular holder that holds a part of the igniter and is fixed to one end portion of the housing in an axial direction; and a closing member fixed to another end portion of the housing in the axial direction, in which the holder includes: a tubular first holder disposed on a side of the one end portion of the housing and capable of fitting an external connector that energizes the igniter on the side of the one end portion; a tubular second holder disposed on an inner side of the housing of the first holder in a state of being in contact with the first holder, in which an outer diameter of at least a portion (hereinafter, a contact portion) in contact with an inner wall of the housing is larger than an outer diameter of the first holder on a side of the other end portion or a diameter same as an outer diameter of the first holder on the side of the other end portion; and a tubular third holder including, on an outer side surface, at least a portion (hereinafter, a small-diameter portion) having a diameter smaller than a diameter of an end portion on a side opposite to a side of the second holder, and disposed on an inner side of the housing with respect to the second holder in a state of being in contact with the second holder, and a portion of the contact portion of the second holder corresponding to a portion on a side of the first holder and a portion corresponding to the small-diameter portion of the third holder are subjected to diameter reduction processing from an outer side of the housing, and the holder is fixed to the housing by sandwiching at least a portion of the first holder in contact with the second holder and a portion of the third holder in contact with the second holder together with the second holder with a portion of the housing subjected to the diameter reduction processing.

(2) In the gas generator of (1) described above, it is preferable that at least a part on a side of one end portion of the second holder is fitted and inserted into the first holder, and another end portion of the first holder is fixed to the housing in a state of being sandwiched between the inner wall of the housing of a portion subjected to the diameter reduction processing at a location corresponding to an annular groove portion of the first holder and at least a part on a side of one end portion of the holder.

(3) In the gas generator of (1) or (2) described above, it is preferable that a brim portion is provided on a side of the closing member of the third holder, and at least at the time of activation, a tip portion of the brim portion is in contact with the inner wall of the housing.

(4) As another aspect, a gas generator of the present invention includes: a long cylindrical housing that is loaded with a gas generating agent that generates a gas by burning, includes a filter inside through which the gas passes, and has a gas ejection port that ejects the gas formed at a position corresponding to the filter: an igniter capable of igniting and combusting the gas generating agent and including a tubular cup-shaped member on a side of the gas generating agent; a tubular holder that holds a part of the igniter and is fixed to one end portion of the housing in an axial direction; and a closing member fixed to another end portion of the housing in the axial direction, in which the holder includes: a tubular first holder disposed on a side of the one end portion of the housing and capable of fitting an external connector that energizes the igniter on the side of the one end portion: a tubular second holder disposed on an inner side of the housing of the first holder in a state of being in contact with the first holder, in which an outer diameter of at least a portion (hereinafter, a contact portion) in contact with an inner wall of the housing is larger than an outer diameter of the first holder on a side of the other end portion or a diameter same as an outer diameter of the first holder on the side of the other end portion: and a tubular third holder including, on an outer side surface, at least a portion (hereinafter, a small-diameter portion) having a diameter smaller than a diameter of an end portion on a side opposite to a side of the second holder, a brim portion being provided on a side of the closing member, the third holder being disposed on an inner side of the housing with respect to the second holder such that a tip portion of the brim portion comes into contact with the inner wall of the housing in a state of being in contact with the second holder and at least at the time of activation, a portion of the contact portion of the second holder corresponding to a portion on a side of the first holder and a portion corresponding to the small-diameter portion of the third holder are subjected to diameter reduction processing from an outer side of the housing, and the first holder and the second holder are fixed to the housing by sandwiching at least a portion of the first holder in contact with the second holder together with the second holder with a portion of the housing subjected to the diameter reduction processing, and the third holder is fixed to the igniter by press-fitting an inside of the third holder into the cup-shaped member of the igniter.

(5) In the gas generator of (1) to (4) described above, it is preferable that a surface of the third holder on a side of the gas generating agent is formed such that the surface of the third holder on the side of the gas generating agent formed around a tip portion of the igniter is flush with a surface of the tip portion of the igniter.

(6) In the gas generator of (1) to (5) described above, it is preferable that the second holder is a tubular member including a fitting portion that fits and holds the igniter inside, and a caulking portion that is provided at an opening end portion on a side of the other end portion and caulks and fixes the igniter, and the third holder is formed to cover the caulking portion.

(7) In the gas generator (1) to (6) described above, it is preferable that the first holder and the third holder are made of resin, and the second holder is made of metal or alloy.

Advantageous Effects of Invention

According to the present invention, it is possible to provide a gas generator that is easier to manufacture than before.

DESCRIPTION OF EMBODIMENTS

First Embodiment

Figure 1:
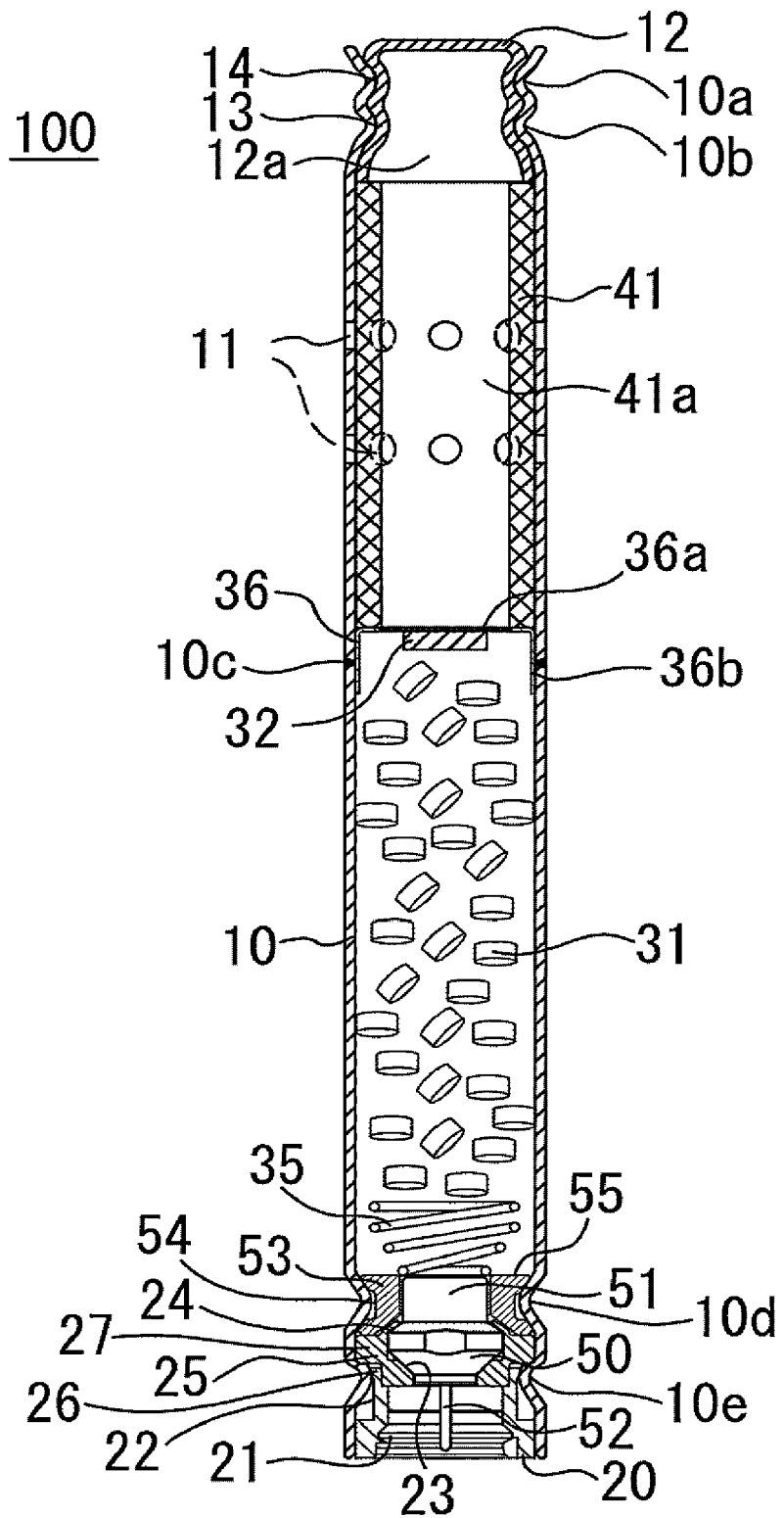
FIG. 1 is a schematic view (partially omitted) illustrating an internal structure of a gas generator according to a first embodiment of the present invention partially illustrated in cross section.

Hereinafter, an internal structure of a cylinder-type gas generator according to an embodiment of the present invention will be described with reference to FIG. 1.

Configuration of Gas Generator 100

A gas generator 100 has a long substantially columnar outer shape, and includes a housing 10, a first holder 20, a second holder 25, and a third holder 53 attached near one opening end of the housing 10, and a closing member 12 attached to the other end of the housing 10 so as to close the other opening end of the housing 10. Note that the first holder 20, the second holder 25, and the third holder 53 constitute a holder that holds an igniter 50.

The housing 10 includes a long cylindrical member having circumferential walls 10a, 10b, 10c, 10d, and 10e and having openings at both ends in an axial direction. The closing member 12 includes annular groove portions 13 and 14 formed by reducing a diameter of a circumferential surface of a bottomed tubular member having a predetermined thickness by caulking (an example of a diameter reduction processing method) and fixing described later, and is formed in a substantially vessel shape including an internal space 12a. The annular groove portions 13 and 14 formed by the caulking and fixing are formed on the circumferential surface of the closing member 12 so as to extend in a circumferential direction. Furthermore, a gas ejection port 11 is provided in a circumferential wall in the vicinity of an end portion of the housing 10 on a side where the closing member 12 is attached. The gas ejection port 11 is a hole for ejecting a gas generated inside the gas generator 100 to the outside, and a plurality of the gas ejection ports 11 are provided along the circumferential direction and the axial direction of the housing 10.

Furthermore, the closing member 12 is made of metal such as stainless steel, steel, aluminum alloy, or stainless alloy. Then, as illustrated in FIG. 1, in a state where a part of the closing member 12 is inserted into one opening end of the housing 10, the circumferential walls 10a and 10b of the housing 10 at a portion corresponding to a part of the circumferential surface of the closing member 12 are radially reduced (caulked) inward to form the annular groove portions 13 and 14, whereby the closing member 12 is caulked and fixed to the housing 10.

The first holder 20 is a substantially tubular member made of resin, and includes a fitting portion 21 to which a female connector (not illustrated) for energizing the igniter 50 can be fitted on an opposite side of a holding position of the igniter 50, an annular groove portion 22 formed on an outer circumferential surface so as to extend in the circumferential direction, and a flange portion 26 formed at an end portion of the annular groove portion 22 on a side of the second holder 25. The flange portion 26 is formed to have an outer diameter smaller than an outer diameter of an annular portion 27 of the second holder 25. The annular portion 27 includes, on an outer circumference, a portion (contact portion) in contact with the inner wall of the housing. Note that the circumferential wall 10e of the housing 10 in a portion corresponding to the flange portion 26 provided on the outer circumferential surface of the first holder 20 is radially reduced (caulked) inward to engage with the flange portion 26, whereby the first holder 20 is caulked and fixed to the housing 10. Furthermore, an end portion of the second holder 25 on a side of the first holder 20 is inserted into the first holder 20. As a result, in a case where a diameter of the circumferential wall 10e of the housing 10 is reduced radially inward, the flange portion 26 is sandwiched between the end portion of the second holder 25 on the side of the first holder 20 and an inner wall of the circumferential wall 10e of the housing 10, and the first holder 20 can be more firmly fixed to the housing 10. That is, sealability between the housing 10 and the holder can be secured. Here, as one modification, instead of the flange portion 26, as a simple end portion (having no flange protruding in a radial direction) continuous from a surface of the annular groove portion 22, the end portion may be sandwiched between the end portion of the second holder 25 on the side of the first holder 20 and the inner wall of the circumferential wall 10e of the housing 10.

Here, as a raw material of the first holder 20, a resin material excellent in heat resistance, durability, corrosion resistance, and the like after curing is suitably selected and used. In this case, the raw material is not limited to a thermosetting resin typified by an epoxy resin or the like, a thermoplastic resin typified by a polybutylene terephthalate resin, a polyethylene terephthalate resin, a polyamide resin (for example, nylon 6, nylon 66, or the like), a polypropylene sulfide resin, a polypropylene oxide resin, a polyacetal resin, or the like can also be used. In a case where these thermoplastic resins are selected as raw materials, it is preferable to contain glass fibers or the like as fillers in these resin materials in order to secure the mechanical strength of the first holder 20 after molding. However, in a case where sufficient mechanical strength can be secured only by the thermoplastic resin, it is not necessary to add the filler as described above. The third holder 53 can also be formed of the same raw material as the first holder 20.

Note that, as described above, the female connector is formed in the fitting portion 21 of the first holder 20. The female connector is a portion to which a male connector of a harness that transmits a signal from a collision detection means provided separately from the gas generator 100 is connected. A retainer (not illustrated) is attached to the female connector. This retainer is attached to prevent the cylinder-type gas generator 100 from malfunctioning due to electrostatic discharge or the like at the time of conveying the gas generator 100 or the like, and when the male connector of the harness is inserted into the female connector at the assembling stage to an airbag device, the contact with a terminal pin 52 is released.

A portion of the second holder 25 in contact with the inner wall of the housing 10 is larger than an outer diameter of the flange portion 26 of the first holder 20, and is a substantially tubular member made of metal such as stainless steel or steel, an aluminum alloy, a stainless alloy, or the like. Furthermore, the second holder 25 includes a tapered fitting portion 23 into which a part (mainly a main body portion) of the igniter 50 is inserted and into which the igniter 50 is fitted, and a part of the outside is fitted and inserted into the first holder 20. Note that the igniter 50 is caulked and fixed to the second holder 25 by a caulking portion 24 provided at the opening end portion. Furthermore, the second holder 25 is fixed to the housing 10 by forming a circumferential wall 10d described later and the circumferential wall 10e described above in a state where the second holder 25 is sandwiched between the first holder 20 and the third holder 53.

The third holder 53 is a substantially tubular member made of resin, and has an annular groove portion 54 (small-diameter portion) for caulking and fixing formed on the outer circumferential surface so as to extend in the circumferential direction, and a surface 55 that is flush or substantially flush with the surface of the tip portion of a squib cup 51. The third holder 53 is fixed to the housing 10 by performing diameter reduction processing (caulking processing or the like) from the outer circumference to the inner side of the housing 10 at a position corresponding to the annular groove portion 54 to form the circumferential wall 10d. Furthermore, a part of the igniter 50 (mainly the squib cup 51) and the caulking portion 24 are inserted into the third holder 53. Furthermore, the third holder 53 is also a directional member that directs a direction of the flame generated in the igniter 50 toward a gas generating agent 31 at the time of activation. Here, as one modification, the annular groove portion 54 does not necessarily have a groove shape, and may be formed so as to include at least a portion having a diameter smaller than a diameter of the end portion (portion near the surface 55) on a side (side of the gas generating agent 31) opposite to the side of the second holder 25 of the third holder 53 to such an extent that the annular groove portion 54 can be used for fixing by diameter reduction processing.

As illustrated in FIG. 1, the igniter 50 as an ignition means of the gas generating agent 31 is disposed at one end portion (that is, a portion close to the holder (first holder 20, second holder 25, and third holder 53)) of the housing 10 in the axial direction. Note that the holder (first holder 20, second holder 25, and third holder 53) that fixes the igniter 50 and the igniter 50 has a function as an ignition means that generates flame for burning the granular gas generating agent 31 to be described later.

As illustrated in FIG. 1, the igniter 50 is held together with the third holder 53 described later in a state of being inserted into the fitting portion 23 of the second holder 25. More specifically, the igniter 50 includes a base frame through which a pair of the terminal pins 52 is inserted and held, and the squib cup 51 (cup-shaped member) attached on the base frame, and a resistor (bridge wire) is attached so as to connect a tip of the terminal pin 52 inserted into the squib cup 51, and the squib cup 51 is filled with an igniter powder so as to surround the resistor or to be in contact with the resistor. As the resistor, a nichrome wire or the like is generally used, and as the igniter powder, zirconium potassium perchlorate (ZPP), zirconium tungsten potassium perchlorate (ZWPP), lead tricinate, or the like is generally used. Note that the inside of the squib cup 51 may be further filled with not only the igniter powder but also an enhance agent, and as the enhance agent that can be disposed simultaneously with the igniter powder, a composition including a metal/oxidizing agent represented by boron/potassium nitrate or the like, a composition including titanium hydride/potassium perchlorate, a composition including boron/5-aminotetrazole/potassium nitrate/molybdenum trioxide, or the like is used.

When the collision is detected, a predetermined amount of current flows through the resistor via the terminal pin 52. When the predetermined amount of current flows through the resistor, Joule heat is generated in the resistor, and the igniter powder starts combustion by receiving this heat. The hot flame resulting from the combustion ruptures the squib cup 51 containing the igniter powder. The time from when the current flows through the resistor to when the igniter 50 activates is 2 milliseconds or less in a case where a nichrome wire is used as the resistor.

Furthermore, the squib cup 51 is generally made of metal or resin. Note that the circumferential wall portion of the squib cup 51 other than the vicinity of the tip portion is caulked and fixed to the second holder 25 by the caulking portion 24 together with the igniter 50.

In the housing 10, the gas generating agent 31, an AI agent 32, a winding spring 35, and a bypass preventing member 36 are disposed in a space between the igniter 50 and the filter 41.

The gas generating agent 31 is an integrally molded product that is ignited by flame generated by being ignited by the igniter 50 and generates gas by burning. Furthermore, the gas generating agent 31 is generally formed as a molded body containing fuel, an oxidant, and an additive. As the fuel, for example, a triazole derivative, a tetrazole derivative, a guanidine derivative, an azodicarbonamide derivative, a hydrazine derivative, or the like, or a combination thereof is used. Specifically, for example, nitroguanidine, guanidine nitrate, cyanoguanidine, 5-aminotetrazole, or the like is suitably used. Furthermore, examples of the oxidizing agent include basic metal nitrates such as basic copper nitrate, basic metal carbonates such as basic copper carbonate, perchlorates such as ammonium perchlorate or potassium perchlorate, and nitrates containing cations selected from alkali metals, alkaline earth metals, transition metals, and ammonia. As the nitrate, for example, sodium nitrate, potassium nitrate or the like is suitably used. Furthermore, examples of the additive include a binder, a slag forming agent, and a combustion adjusting agent. As the binder, for example, a cellulose derivative such as hydroxypropylene methyl cellulose, an organic binder such as a metal salt of carboxymethyl cellulose or a stearate, and an inorganic binder such as synthetic hydroxytalcite or acidic clay can be suitably used. Silicon nitride, silica, acid clay, and the like can be suitably used as the slag forming agent. Furthermore, as the combustion adjusting agent, metal oxide, ferrosilicon, activated carbon, graphite, and the like can be suitably used.

The bypass preventing member 36 has a bottom surface portion 36a having a weak member at a central portion and an outer circumferential wall portion 36b, and is welded and fixed to the housing 10 via a circumferential wall 10c which is also a welded portion. The bypass preventing member 36 is also a member that partitions the housing 10 into the filter 41 and the combustion chamber of the gas generating agent 31, and the weak member of the bottom surface portion 36a is broken by the pressure of the generated gas at the time of activation. Furthermore, the bypass preventing member 36 is disposed such that the bottom surface portion 36a is in contact with the end portion of the filter 41 and the outer circumferential wall portion 36b is in contact with the inner wall of the housing 10. As a result, the generated gas can be bypassed from between the inner wall of the housing 10 and the outer circumferential portion of the filter 41, and can be prevented from leaking to the gas ejection port 11. That is, the bypass preventing member 36 can cause the gas generated at the time of activation to flow into a side of the filter 41 through the ruptured central portion.

The winding spring 35 is disposed such that one end thereof is in contact with a tip side (flame injection side) of the igniter 50. Furthermore, the winding spring 35 is formed in a spiral shape whose diameter increases from one end side to the other end side, and presses the gas generating agent 31 against a side of the bypass preventing member 36 at the other end side.

The AI agent 32 is provided in a substantially central portion of the bottom surface portion 36a of the bypass preventing member 36 on the side of the igniter 50, and has an auto-ignition (AI) function of automatically igniting without depending on the activation of the igniter 50. More specifically, since the AI agent 32 automatically ignites at a temperature lower than that of the gas generating agent 31, it is possible to prevent induction of an abnormal operation of the gas generator 100 due to heating from the outside in a case where a fire or the like occurs in a vehicle or the like equipped with an airbag device or the like in which the gas generator 100 is incorporated.

The filter 41 is formed of a cylindrical member having a substantially cylindrical hollow portion 41a at the center. Note that, by using the filter 41 made of the above-described cylindrical member, the flow resistance of a working gas flowing at the time of activation is suppressed to be low, and efficient gas flow is possible. As the filter 41, for example, a wire material made of metal such as stainless steel or steel, a wire material obtained by winding a net material, a wire material obtained by pressing a net material, or the like is used. Specifically, a knitted wire mesh, a plain weave wire mesh, an aggregate of crimp weave metal wire materials, or the like is used. When the gas generated in the housing 10 passes through the filter 41, the filter 41 functions as a cooling means for cooling the gas by depriving high temperature heat of the gas, and also functions as a removal means for removing slag and the like contained in the gas. Here, as a modification of the filter 41, a filter having a labyrinthine flow path formed by combining substantially cylindrical or mortar parts made of metal may be used. As a result, since the course of the working gas can be changed in various directions, it is possible to cool the gas and remove the slag.

Furthermore, in the embodiment of the present invention described above, the case of using what is called knitted wire mesh as the filter has been exemplified, but instead of this, it is also possible to use a filter manufactured by winding a punching metal or a filter manufactured by winding an expanded metal. Here, the punching metal is a metal plate in which only an opening portion is provided in the plate-shaped metal member (that is, a protrusion portion is not provided on a circumferential edge of the opening portion), and the expanded metal is a metal plate in which openings are provided in the plate-shaped metal member to form a mesh shape by cutting the plate-shaped metal member in, for example, a staggered manner and expanding the cuts. Even in a case where such punching metal or expanded metal is used instead of the above-described knitted wire mesh, the same effects as the effects described in the embodiment of the present invention can be obtained.

Furthermore, in the punching metal and the expanded metal described above, a filter including a laminate is configured by winding a single metal plate-like member, but the configuration of the filter is not limited to this configuration. That is, each layer may be formed of separate metal plate-like members, and the layers may be combined to form a filter formed of a laminate, or a part of a plurality of layers may be formed by winding a single metal plate-like member, and the remaining layers may be formed by winding another single metal plate-like member, and the layers may be combined to form a filter formed of a laminate.

Next, operation of the gas generator 100 described above at the time of activation will be described. In a case where the vehicle mounted with the airbag device in which the gas generator 100 in the present embodiment is incorporated collides, the collision is detected by a collision detection means separately provided in the vehicle, and the igniter 50 is operated based on the collision. When the igniter 50 is activated, the combustion of the igniter powder increases the pressure in the igniter 50, which ruptures the tip of the squib cup 51 of the igniter 50, causing flames to flow out of the tip of the squib cup 51 of the igniter 50 toward the gas generating agent 31 inside the housing 10.

The flame thus flowed ignites and burns the gas generating agent 31 in the housing 10 to generate a large amount of gas. By the combustion of the gas generating agent 31, the pressure in the housing 10 increases, and the generated gas ruptures the weak member of the bottom surface portion 36a of the bypass preventing member 36 and flows into the hollow portion 41a and the internal space 12a. Thereafter, the generated gas is ejected from the gas ejection port 11 to the outside of the gas generator 100 via the filter 41, but since the generated gas passes through the filter 41, the generated gas is cooled to a predetermined temperature. Then, the gas ejected from the gas ejection port 11 is guided into the airbag to inflate and deploy the airbag.

Main Features of Gas Generator 100

According to the present embodiment, since the holder is divided into three members (first holder 20, second holder 25, and third holder 53), it is not necessary to form a complicated shape at a time, and thus it is possible to provide the gas generator 100 which is easier to manufacture than before.

Furthermore, according to the present embodiment, since there is no empty volume around the igniter 50, the pressure in the vicinity of the igniter 50 immediately after the activation of the igniter 50 can be increased as compared with a case where there is the empty volume. As a result, as compared with the case where there is the empty volume, the time (TTFG) from the start of activation until the generated gas is ejected from the gas ejection port can be shortened, and the combustibility of the gas generating agent 31 can be improved. That is, according to the present embodiment, by shortening the TTFG and improving the flammability of the gas generating agent 31, the initial rise of the pressure in the housing 10, which rises with the lapse of time, can be made sharper than before (improvement of P-t performance).

Furthermore, according to the present embodiment, the third holder 53 can impart directivity in the direction of flame of the igniter 50, and can reliably protect the circumferential wall 10d deformed by the diameter reduction processing of the housing 10 from the pressure of the gas generated at the time of activation. In particular, since the third holder 53 has the surface 55 flush or substantially flush with the surface of the tip portion of the squib cup 51, the third holder 53 can make the directivity of the direction of flame of the igniter 50 more accurate, and can more accurately protect the circumferential wall 10d from the pressure of the gas generated at the time of activation.

Furthermore, according to the present embodiment, the end portion of the first holder 20 on the side of the second holder 25 is sandwiched between the end portion of the second holder 25 on the side of the first holder 20 and the inner wall of the circumferential wall 10e of the housing 10, so that the first holder 20 can be more firmly fixed to the housing 10. That is, even if the holder is divided into three members (first holder 20, second holder 25, and third holder 53), sealability between the housing 10 and the holder (first holder 20, second holder 25, and third holder 53) can be secured.

Furthermore, according to the present embodiment, the third holder 53 can be used as a protective member of the caulking portion 24 of the second holder 25.

Furthermore, according to the present embodiment, since the first holder 20 and the third holder 53 are made of resin and the second holder 25 is made of metal or alloy, it is easier to mold the holder than before, and the weight can be reduced as compared with a case where the entire holder is made of metal or alloy. That is, according to the present embodiment, it is possible to provide the gas generator 100 that can be more easily manufactured and lighter than the conventional gas generator and can reliably suppress the cost.

Furthermore, in the present embodiment, since the closing member 12 and the housing 10 are caulked together, the caulking position is not particularly limited as long as it is a position where the closing member 12 can be fixed to the housing 10. Therefore, since it is not necessary to manage the caulking position (accurate positioning or the like) as in the related art, the manufacturing process can be simplified.

Furthermore, in the present embodiment, since the internal space 12a is provided in the closing member 12, the space volume can be increased as compared with the case of using the conventional closing member, and the internal pressure at the time of gas generation can be reduced.

Second Embodiment

Figure 2:
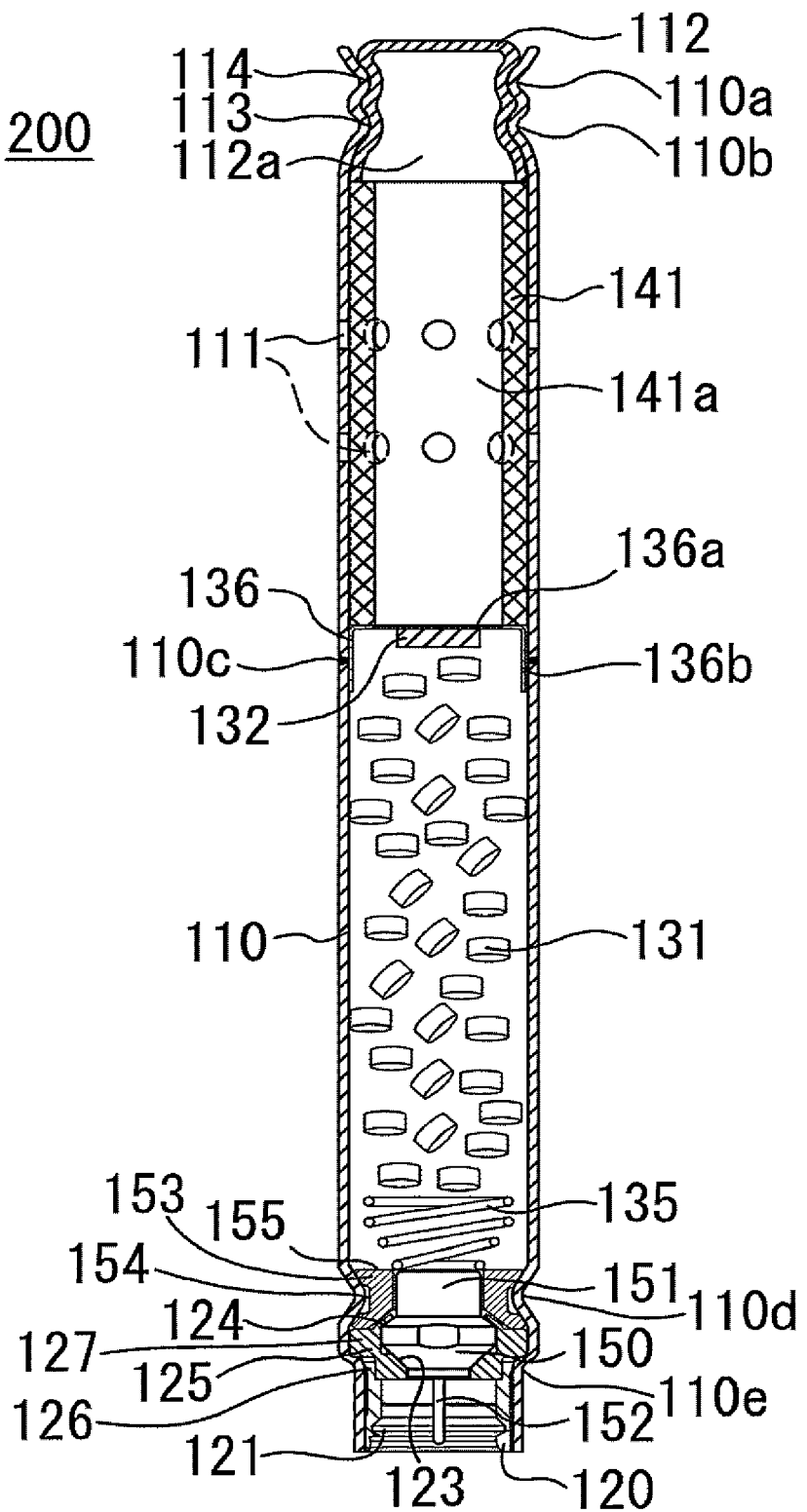
FIG. 2 is a schematic view (partially omitted) illustrating an internal structure of a gas generator according to a second embodiment of the present invention partially illustrated in cross section.

Next, a second embodiment of the present invention will be described with reference to FIG. 2. Note that, in the present embodiment, the parts having the same reference signs as those in the first embodiment up to the last two digits are the same as those in the first embodiment, and thus the description thereof may be omitted. Furthermore, in the present embodiment, portions that are not particularly described are similar to those of the first embodiment, and thus description and illustration thereof may be omitted.

A gas generator 200 according to the present embodiment is different from the first embodiment mainly in that a first holder 120 is formed in a tubular shape so as to have a smaller maximum outer diameter than the first holder 20 of the first embodiment, and that a circumferential wall 110e is formed following an outer shape of the first holder 120.

The first holder 120 is a substantially cylindrical member having a substantially constant outer diameter, and has a flange portion 126 formed at an end portion on a side of a second holder 125. Note that the circumferential wall 110e of a housing 110 in a portion corresponding to the flange portion 126 provided on the outer circumferential surface of the first holder 120 is radially reduced (caulked) to engage with the flange portion 126, whereby the first holder 120 is caulked and fixed to the housing 110. Furthermore, an end portion of the second holder 125 on a side of the first holder 120 is inserted into the first holder 120. As a result, when the diameter of the circumferential wall 110e of the housing 110 is reduced radially inward, the flange portion 126 is sandwiched between the end portion of the second holder 125 on the side of the first holder 120 and the inner wall of the circumferential wall 110e of the housing 110, and the first holder 120 can be more firmly fixed to the housing 110. That is, sealability between the housing 110 and the holder can be secured. Here, as one modification, instead of the flange portion 126, a simple end portion (having no flange protruding in the radial direction) may be provided, and the end portion may be sandwiched between the end portion of the second holder 125 on the side of the first holder 120 and the inner wall of the circumferential wall 110e of the housing 110.

According to the present embodiment, the same effects as those of the first embodiment can be obtained. Furthermore, since the first holder 120 can be made smaller in size than the first holder 20 of the first embodiment, the gas generator 200 can be made lighter than the gas generator 100. Furthermore, as compared with the first embodiment, the accuracy of the position of diameter reduction processing on the circumferential wall 110e is not required.

Third Embodiment

Figure 3:
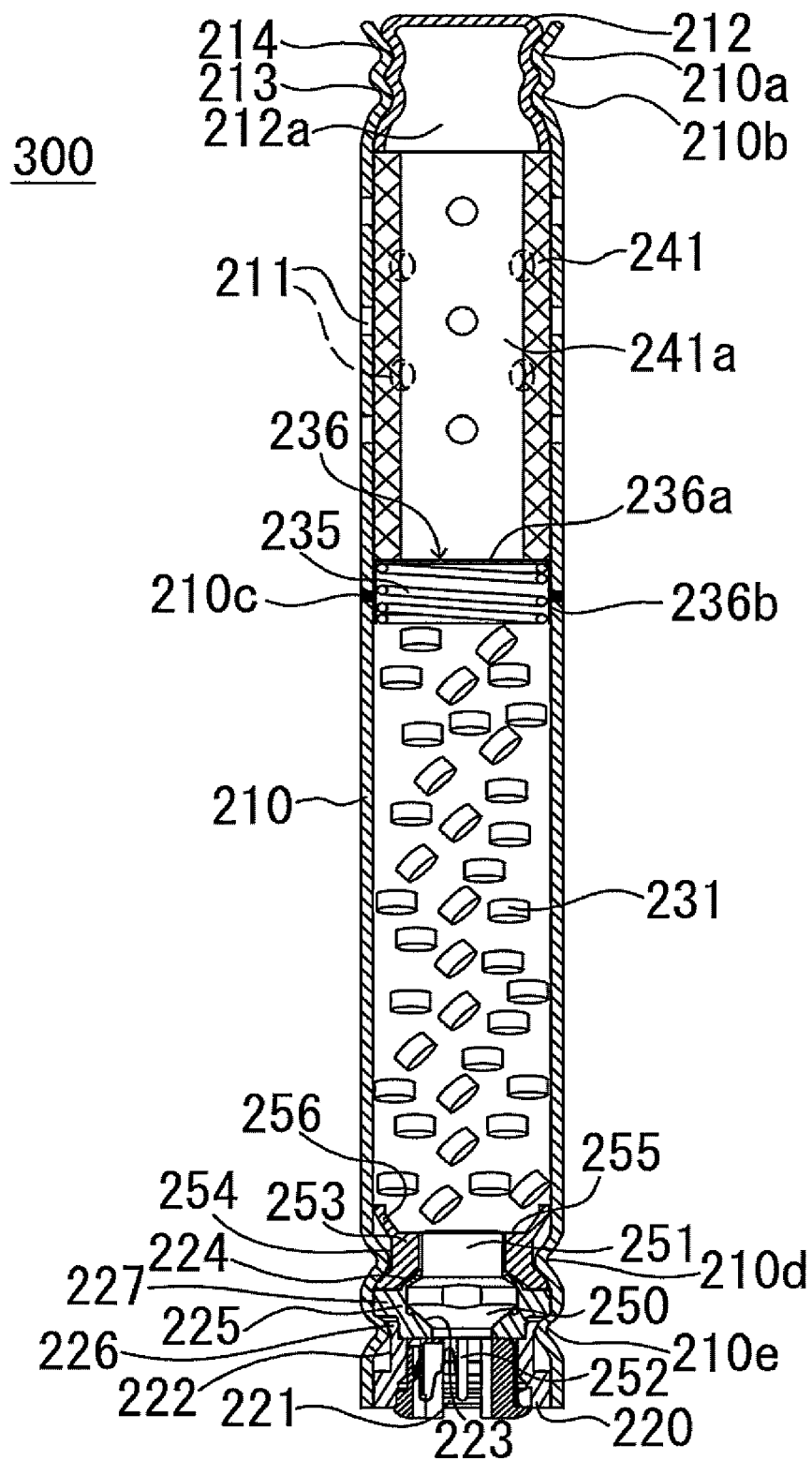
FIG. 3 is a schematic view (partially omitted) illustrating an internal structure of a gas generator according to a third embodiment of the present invention partially illustrated in cross section.

Next, a third embodiment of the present invention will be described with reference to FIG. 3. Note that, in the present embodiment, the parts having the same reference signs as those in the first embodiment up to the last two digits are the same as those in the first embodiment, and thus the description thereof may be omitted. Furthermore, in the present embodiment, portions that are not particularly described are similar to those of the first embodiment, and thus description and illustration thereof may be omitted.

A gas generator 300 according to the present embodiment is different from that of the first embodiment mainly in that a winding spring 235 is provided inside a bypass preventing member 236 and that a brim portion 256 is provided on a side of a closing member 212 of a third holder 253.

The winding spring 235 is disposed such that one end thereof is in contact with a bottom portion of the bypass preventing member 236. Furthermore, the winding spring 235 is formed in a tubular shape, and presses a gas generating agent 231 toward an igniter 250 on the other end side.

The brim portion 256 is a portion extending from the edge portion of the third holder 253 on a side of the closing member 212, and is formed such that at least the tip portion of the brim portion 256 is deformed so as to be stuck to (come into contact with) an inner wall of a housing 210 by the pressure of the gas generated when the gas generating agent 231 burns. As a result, a circumferential wall 210d of the housing 210 subjected to diameter reduction processing can be protected from the pressure of the gas. Therefore, the third holder 253 having the brim portion 256 can prevent the circumferential wall 210d of the housing 210 subjected to the diameter reduction processing from being directly exposed to the heat of the generated gas, so that the strength of the circumferential wall 210d can be maintained. Note that the tip portion of the brim portion 256 only needs to be in contact with the inner wall of the housing 210 at least at the time of activation, and may not be in contact with or may be in contact with the inner wall of the housing 210 in the initial state.

Furthermore, in a case where it is assumed that there is no brim portion 256, there is a space where the flame generated by the igniter 250 hardly reaches (near the corner portion between the vicinity of the edge portion of the third holder 53 and the inner wall of the housing 10 in the first embodiment). On the other hand, when the brim portion 256 is provided, the space is eliminated, so that the performance of the gas generator itself can be improved. In particular, by forming the brim portion 256 into a shape that allows the flame to easily reach (for example, a mortar shape), the performance of the gas generator itself can be further improved.

Furthermore, since the brim portion 256 is integrally molded with the third holder 253, the above-described effect by the brim portion 256 can be achieved without increasing the number of components.

Furthermore, according to the present embodiment, it is possible to achieve the same effects as those of the first embodiment.

Fourth Embodiment

Figure 4:
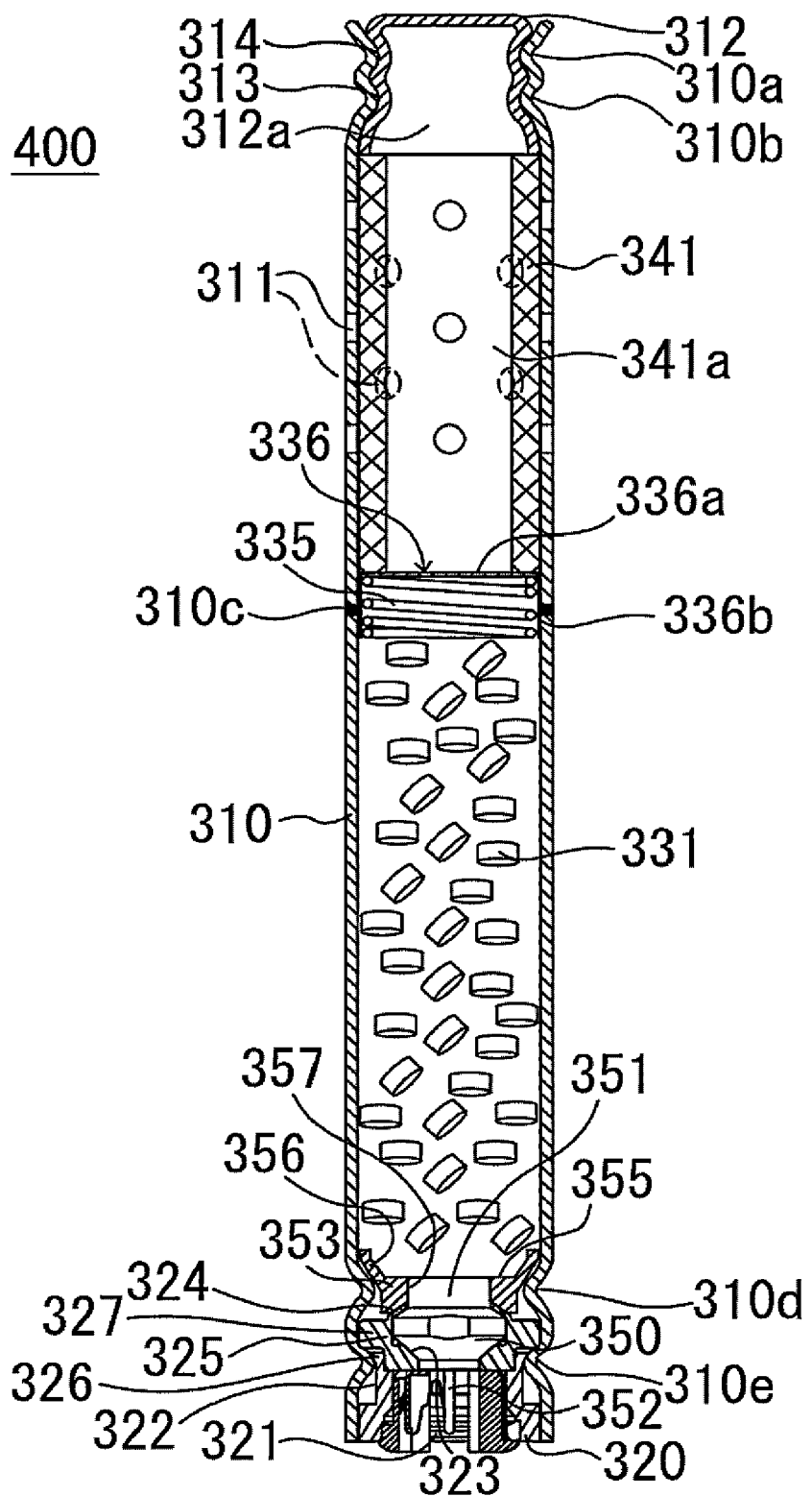
FIG. 4 is a schematic view (partially omitted) illustrating an internal structure of a gas generator according to a fourth embodiment of the present invention partially illustrated in cross section.

Next, a fourth embodiment of the present invention will be described with reference to FIG. 4. Note that, in the present embodiment, the parts having the same reference signs as those in the first embodiment up to the last two digits are the same as those in the first embodiment, and thus the description thereof may be omitted. Furthermore, in the present embodiment, portions that are not particularly described are similar to those of the first embodiment, and thus description and illustration thereof may be omitted.

A gas generator 400 according to the present embodiment is different from that of the first embodiment mainly in that a winding spring 335 is provided inside a bypass preventing member 336, a brim portion 356 is provided on a side of a closing member 312 of a third holder 353, the third holder 353 is not fixed to a housing 310, the third holder 353 is fixed to an igniter 350, and only a first holder 320 and a second holder 325 are sandwiched between a circumferential wall 310d and a circumferential wall 310e of the housing 310.

The winding spring 335 is disposed such that one end thereof is in contact with a bottom portion of the bypass preventing member 336. Furthermore, the winding spring 335 is formed in a tubular shape, and presses a gas generating agent 331 toward the igniter 350 on the other end side.

The third holder 353 has a brim portion 356 extending from an edge portion on a side of the closing member 312, and a hole portion 357 (inside the third holder 353) provided in a central portion. The brim portion 356 can achieve the same effects as those of the brim portion 256 in the third embodiment. Note that the tip portion of the brim portion 356 may be in contact with the inner wall of the housing 310 at least at the time of activation similarly to the brim portion 256 in the third embodiment, and may not be in contact with or may be in contact with the inner wall of the housing 310 in the initial state.

Furthermore, the hole portion 357 is press-fitted into a tip portion of a squib cup (cup-shaped member) 351 of the igniter 350. Therefore, the third holder 353 is press-fitted and fixed to the igniter 350. As a result, it is possible to prevent gas generated by combustion of the gas generating agent 331 from entering between the hole portion 357 and the squib cup 351 and to protect the circumferential wall 310d of the housing 310 subjected to diameter reduction processing. That is, since the circumferential wall 310d can be prevented from being exposed by the heat of the generated gas, the strength of the circumferential wall 310d can be further maintained.

Furthermore, according to the present embodiment, since it is not necessary to form portions such as the annular groove portions 54, 154, and 254 of the third holders 53, 153, and 253 of the first to third embodiments, complicated formation is not required and cost reduction is possible as compared with the first to third embodiments.

Furthermore, according to the present embodiment, it is possible to achieve the same effects as those of the first embodiment.

Although the embodiments of the present invention have been described above with reference to the drawings, it should be understood that the specific configuration is not limited to these embodiments. The scope of the present invention is defined not by the above description of the embodiment but by the claims, and further includes meanings equivalent to the claims and all modifications within the scope of the claims.

For example, in each of the above embodiments, the flange portion (end portion) of the first holder is sandwiched between the end portion of the second holder on the side of the first holder and the inner wall of the circumferential wall of the housing subjected to diameter reduction processing, but the present invention is not limited thereto. That is, for example, at least a part of the outer circumference of the first holder and the end of the second holder on the side of the first holder and/or the inner wall of the housing may be bonded with an adhesive without sandwiching the flange (end) of the first holder. As another example, the first holder may be press-fitted into the housing.

Furthermore, in each of the above embodiments, the caulking processing has been described as an example of the method of reducing the diameter of the housing, but any processing method capable of reducing the diameter of the housing may be used.

Furthermore, although the outer diameter of the second holder in each of the above embodiments is larger than the outer diameter of the first holder on the other end side, the present invention is not limited thereto. For example, the outer diameter of the second holder may be the same as the outer diameter on the other end side of the first holder.

REFERENCE SIGNS LIST 10, 110, 210, 310 housing
10a, 10b, 10c, 10d, 10e, 110a, 110b, 110c, 110d, 110e, 210a, 210b, 210c, 210d, 210e, 210a, 210b, 210c, 210d, 210e circumferential wall
11, 111, 211, 311 gas ejection port
12, 112, 212, 312 closing member
12a, 112a, 212a, 312a internal space
13, 14, 22, 54, 113, 114, 154, 213, 214, 222, 254, 313, 314, 322 annular groove portion
20, 120, 220, 320 first holder
21, 23, 121, 123, 221, 223, 321, 323 fitting portion
24, 124, 224, 324 caulking portion
25, 125, 225, 325 second holder
26, 126, 226, 326 flange portion
27, 127, 227, 327 annular portion
31, 131, 231, 331 gas generating agent
32, 132 AI agent
35, 135, 235, 335 winding spring
36, 136, 236, 336 bypass preventing member
36a, 136a, 236a, 336a bottom surface portion
36b, 136b, 236b, 336b outer circumferential wall portion
41, 141, 241, 341 filter
41a, 141a, 241a, 341a hollow portion
50, 150, 250, 350 igniter
51, 151, 251, 351 squib cup
52, 152, 252, 352 terminal pin
53, 153, 253, 353 third holder
55, 155, 255, 355 surface
100, 200, 300, 400 gas generator

The invention claimed is:

1. A gas generator comprising:
a housing being cylindrical and being loaded with a gas generating agent that generates a gas by burning, the housing including a filter inside through which the gas passes, and having a gas ejection port that ejects the gas formed at a position corresponding to the filter;
an igniter capable of igniting and combusting the gas generating agent;
a holder being tubular and holding a part of the igniter, the holder being fixed to a first end portion of the housing in an axial direction; and
a closing member fixed to a second end portion of the housing in the axial direction,
wherein the holder includes:
a first holder being tubular and disposed on a side of the first end portion of the housing and capable of fitting an external connector that energizes the igniter on the side of the first end portion of the housing,
a second holder being tubular and disposed on an inner side of the housing of the first holder in a state of being in contact with the first holder, an outer diameter of at least a contact portion, in contact with an inner wall of the housing, of the second holder is larger than an outer diameter of the first holder on a side of an end portion of the second holder or the outer diameter of at least the contact portion in contact with the inner wall of the housing of the second holder is same as the outer diameter of the first holder on the side of the end portion of the second holder, and
a third holder being tubular and including, on an outer side surface, at least a small-diameter portion having a diameter smaller than a diameter of an end portion on a side opposite to a side of the second holder, and disposed on an inner side of the housing with respect to the second holder in a state of being in contact with the second holder, and
a portion of the contact portion of the second holder corresponding to a portion on a side of the first holder and a portion corresponding to the small-diameter portion of the third holder are subjected to diameter reduction processing from an outer side of the housing, and the holder is fixed to the housing by sandwiching at least a portion of the first holder in contact with the second holder and a portion of the third holder in contact with the second holder together with the second holder with a portion of the housing subjected to the diameter reduction processing.

2. The gas generator according to claim 1, wherein
at least a part on a side of the end portion of the second holder is fitted and inserted into the first holder, and
an end portion of the first holder is fixed to the housing in a state of being sandwiched between the inner wall of the housing of a portion subjected to the diameter reduction processing at a position corresponding to an annular groove portion of the first holder and at least a part on a side of the end portion of the second holder.

3. The gas generator according to claim 1, wherein
a brim portion is provided on a side of the closing member of the third holder, and
at least at a time of activation, a tip portion of the brim portion is in contact with the inner wall of the housing.

4. A gas generator comprising:
a housing being cylindrical and being that is loaded with a gas generating agent that generates a gas by burning, the housing including a filter inside through which the gas passes, and having a gas ejection port that ejects the gas formed at a position corresponding to the filter;
an igniter capable of igniting and combusting the gas generating agent and including a tubular cup-shaped member on a side of the gas generating agent;
a holder being tubular and holding a part of the igniter, the holder being fixed to a first end portion of the housing in an axial direction; and
a closing member fixed to a second end portion of the housing in the axial direction,
wherein the holder includes:
a first holder being tubular and disposed on a side of the first end portion of the housing and capable of fitting an external connector that energizes the igniter on the side of the first end portion of the housing,
a second holder being tubular and disposed on an inner side of the housing of the first holder in a state of being in contact with the first holder, an outer diameter of at least a contact portion, in contact with an inner wall of the housing, of the second holder is larger than an outer diameter of the first holder on a side of an end portion of the second holder or a diameter the outer diameter of at least the contact portion in contact with the inner wall of the housing of the second holder is same as the outer diameter of the first holder on the side of the end portion of the second holder, and
a third holder being tubular and including, on an outer side surface, at least a small-diameter portion having a diameter smaller than a diameter of an end portion on a side opposite to a side of the second holder, a brim portion being provided on a side of the closing member, the third holder being disposed on an inner side of the housing with respect to the second holder such that a tip portion of the brim portion comes into contact with the inner wall of the housing in a state of being in contact with the second holder and at least at a time of activation, a portion of the contact portion of the second holder corresponding to a portion on a side of the first holder and a portion corresponding to the small-diameter portion of the third holder are subjected to diameter reduction processing from an outer side of the housing, and the first holder and the second holder are fixed to the housing by sandwiching at least a portion of the first holder in contact with the second holder together with the second holder with a portion of the housing subjected to the diameter reduction processing, and the third holder is fixed to the igniter by press-fitting an inside of the third holder into the cup-shaped member of the igniter.

5. The gas generator according to claim 1, wherein a surface of the third holder on a side of the gas generating agent is formed such that the surface of the third holder on the side of the gas generating agent formed around a tip portion of the igniter is flush with a surface of the tip portion of the igniter.

6. The gas generator according to claim 1, wherein the second holder is a tubular member including a fitting portion that fits and holds the igniter inside, and a caulking portion that is provided at an opening end portion on a side of the end portion of the second holder and caulks and fixes the igniter, and the third holder is formed to cover the caulking portion.

7. The gas generator according to claim 1, wherein the first holder and the third holder are made of resin, and the second holder is made of metal or alloy.

8. The gas generator according to claim 2, wherein a brim portion is provided on a side of the closing member of the third holder, and at least at a time of activation, a tip portion of the brim portion is in contact with the inner wall of the housing.

9. The gas generator according to claim 2, wherein a surface of the third holder on a side of the gas generating agent is formed such that the surface of the third holder on the side of the gas generating agent formed around a tip portion of the igniter is flush with a surface of the tip portion of the igniter.

10. The gas generator according to claim 3, wherein a surface of the third holder on a side of the gas generating agent is formed such that the surface of the third holder on the side of the gas generating agent formed around a tip portion of the igniter is flush with a surface of the tip portion of the igniter.

11. The gas generator according to claim 4, wherein a surface of the third holder on a side of the gas generating agent is formed such that the surface of the third holder on the side of the gas generating agent formed around a tip portion of the igniter is flush with a surface of the tip portion of the igniter.

12. The gas generator according to claim 2, wherein the second holder is a tubular member including a fitting portion that fits and holds the igniter inside, and a caulking portion that is provided at an opening end portion on a side of the end portion of the second holder and caulks and fixes the igniter, and the third holder is formed to cover the caulking portion.

13. The gas generator according to claim 3, wherein the second holder is a tubular member including a fitting portion that fits and holds the igniter inside, and a caulking portion that is provided at an opening end portion on a side of the end portion of the second holder and caulks and fixes the igniter, and the third holder is formed to cover the caulking portion.

14. The gas generator according to claim 4, wherein the second holder is a tubular member including a fitting portion that fits and holds the igniter inside, and a caulking portion that is provided at an opening end portion on a side of the end portion of the second holder and caulks and fixes the igniter, and the third holder is formed to cover the caulking portion.

15. The gas generator according to claim 5, wherein the second holder is a tubular member including a fitting portion that fits and holds the igniter inside, and a caulking portion that is provided at an opening end portion on a side of the end portion of the second holder and caulks and fixes the igniter, and the third holder is formed to cover the caulking portion.

16. The gas generator according to claim 2, wherein the first holder and the third holder are made of resin, and the second holder is made of metal or alloy.

17. The gas generator according to claim 3, wherein the first holder and the third holder are made of resin, and the second holder is made of metal or alloy.

18. The gas generator according to claim 4, wherein the first holder and the third holder are made of resin, and the second holder is made of metal or alloy.

19. The gas generator according to claim 5, wherein the first holder and the third holder are made of resin, and the second holder is made of metal or alloy.

20. The gas generator according to claim 6, wherein the first holder and the third holder are made of resin, and the second holder is made of metal or alloy.

* * * * *